US007685401B2

(12) United States Patent
Sugumar et al.

(10) Patent No.: US 7,685,401 B2
(45) Date of Patent: Mar. 23, 2010

(54) GUEST TO HOST ADDRESS TRANSLATION FOR DEVICES TO ACCESS MEMORY IN A PARTITIONED SYSTEM

(75) Inventors: Suresh Sugumar, Kerala (IN); Kiran S. Panesar, Karnataka (IN); Narayan N. Iyer, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 11/616,662

(22) Filed: Dec. 27, 2006

(65) Prior Publication Data
US 2008/0162864 A1 Jul. 3, 2008

(51) Int. Cl.
*G06F 12/00* (2006.01)
(52) U.S. Cl. ............... 711/203; 711/154; 711/170; 718/104
(58) Field of Classification Search ........... 711/203, 711/154, 170; 718/104
See application file for complete search history.

(56) References Cited

U.S. PATENT DOCUMENTS

| 4,843,541 | A | * | 6/1989 | Bean et al. | 710/36 |
| 6,381,682 | B2 | * | 4/2002 | Noel et al. | 711/153 |
| 6,976,083 | B1 | * | 12/2005 | Baskey et al. | 709/232 |
| 6,993,640 | B2 | * | 1/2006 | Doing et al. | 712/200 |
| 7,003,771 | B1 | * | 2/2006 | Arndt | 718/104 |
| 7,200,687 | B2 | * | 4/2007 | Nordstrom et al. | 710/9 |
| 7,366,798 | B2 | * | 4/2008 | Nordstrom et al. | 710/3 |
| 7,426,625 | B2 | * | 9/2008 | Lee | 711/203 |
| 2004/0098544 | A1 | * | 5/2004 | Gaither et al. | 711/154 |
| 2006/0010450 | A1 | * | 1/2006 | Culter | 718/104 |
| 2008/0028408 | A1 | * | 1/2008 | Day et al. | 718/104 |

OTHER PUBLICATIONS

Waldspurger, "Memory Resource Management in VMware ESX Server," Proceedings of the 5th Symposium on Operating System Design and Implementation (ODSI '02), USENIX Association, pp. 1-14, Dec. 2002.*
Chen et al., "High Assurance Computing on Open Hardware Architectures," Microsoft Research Technical Report MSR-TR-2003-20, http://www.research.microsoft.com, pp. 1-17, Mar. 2003.*

* cited by examiner

*Primary Examiner*—Stephen C Elmore
(74) *Attorney, Agent, or Firm*—Thomas R. Lane

(57) ABSTRACT

Embodiments of apparatuses, methods, and systems for guest to host address translations for devices to access memory in a partitioned system are disclosed. In one embodiment, an apparatus includes an interface, partitioning logic, first address translation logic, and second address translation logic. The interface is to receive a request from a device to access memory in a partitioned system. The partitioning logic is to determine whether the device is assigned to a first partition or a second partition. The first address translation logic is to translate a first guest address to a first host address in the first partition. The second address translation logic is to translate a second guest address to a second host address in the second partition.

20 Claims, 6 Drawing Sheets

US 7,685,401 B2

GUEST TO HOST ADDRESS TRANSLATION FOR DEVICES TO ACCESS MEMORY IN A PARTITIONED SYSTEM

BACKGROUND

1. Field

The present disclosure pertains to the field of information processing, and more particularly, to the field of partitioning information processing systems.

2. Description of Related Art

Generally, the concept of partitioning in information processing systems refers to dividing a system into partitions, where each partition is a group of system resources that may be operated as a complete and independent system. The system resources that may be allocated to a partition include processors, processor cores (where individual cores of a multicore processor may be allocated to different partitions), portions of system memory, and input/output ("I/O") devices.

Different types of partitioning are known. In "soft" partitioning, system resources may be shared between partitions. One form of soft partitioning is virtualization, which allows multiple instances of one or more operating systems (each, an "OS") to run on a single system, even though each OS is designed to have complete, direct control over the system and its resources. Virtualization is typically implemented using software known as a virtual machine monitor ("VMM"), which directly controls the physical resources of the system and presents to each OS a "virtual machine" ("VM") having virtual resources, including one or more virtual processors, that the OS may completely and directly control. The VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

Soft partitioning typically requires that a VMM, hypervisor, OS, or other such software is designed to run in one partition of a partitioned system and enforce the sharing of physical resources, which may include preventing any such software running in other partitions from directly controlling physical resources.

In "hard" partitioning, each system resource is typically dedicated to a respective partition. Hard partitioning provides for any OS, VMM, hypervisor, or other such software to be run in each partition without requiring that the software be designed for a partitioned system, because such software may directly control the physical resources of its partition.

BRIEF DESCRIPTION OF THE FIGURES

The present invention is illustrated by way of example and not limitation in the accompanying figures.

DETAILED DESCRIPTION

The present invention may be embodied in apparatuses, methods, and systems for guest to host address translations for devices to access memory in a partitioned system as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention may be used to increase the virtualization capability of a partitioned system.

Elements of embodiments of the invention may be implemented in hardware, software stored on a physical storage medium, firmware, or any combination of hardware, software stored on a physical storage medium, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or expression that is implemented or embodied in a hardware structure (e.g., flash memory or read only memory). Examples of firmware are microcode, writable control store, and micro-programmed structure.

Figure 1:
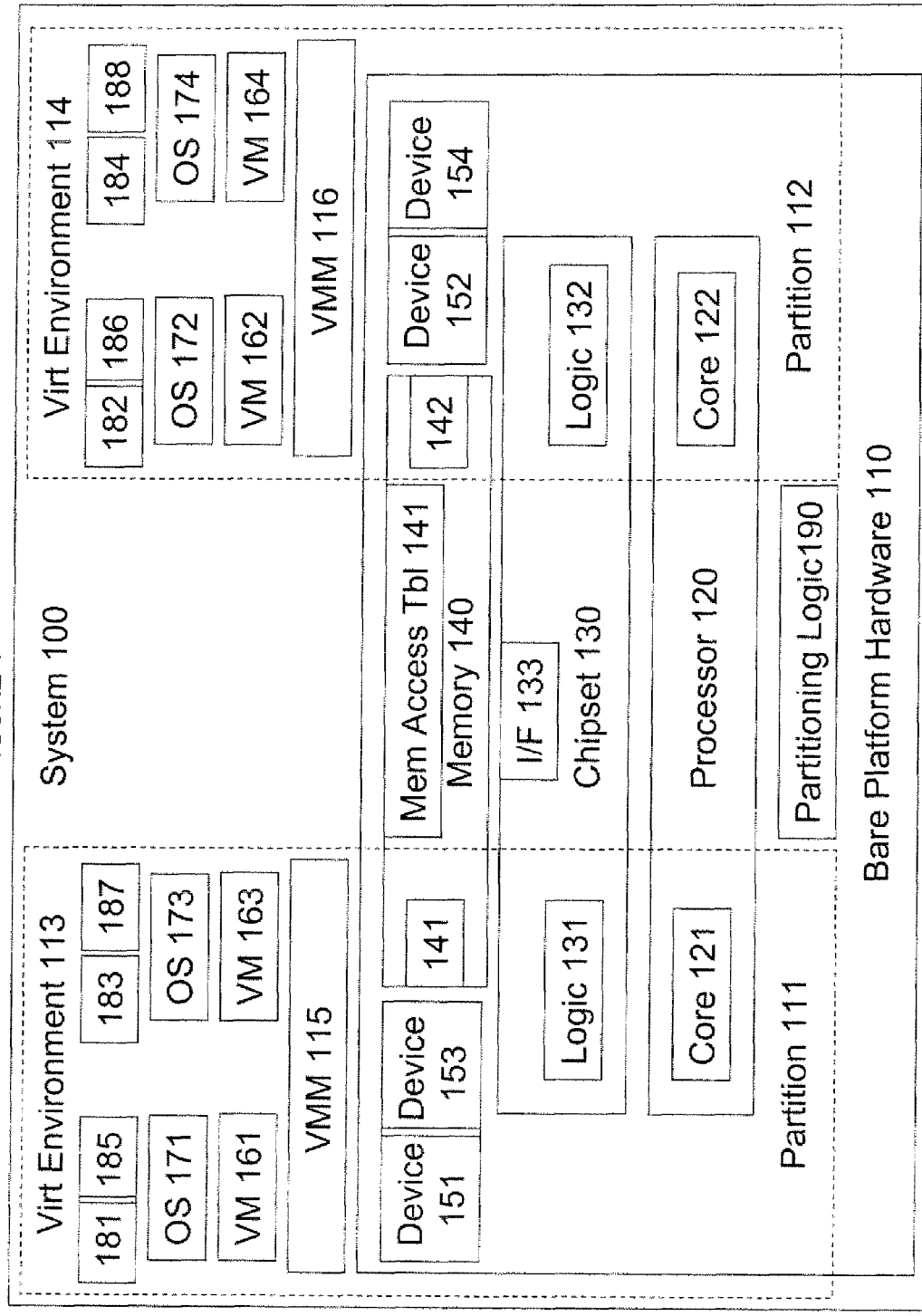
FIG. 1 illustrates an embodiment of the present invention in an information processing system.

FIG. 1 illustrates an embodiment of the present invention in information processing system 100. Information processing system 100 includes bare platform hardware 110, which may be any apparatus capable of executing any OS, VMM, or other software. For example, bare platform hardware 110 may be the hardware of a personal computer, a mainframe computer, a portable computer, a handheld device, a set-top box, a server, or any other computing system. In this embodiment, bare platform hardware 110 includes one or more processor packages 120, chipset(s) 130, system memory 140, and devices 151, 152, 153, and 154.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller, or may be a reconfigurable core (e.g. a field programmable gate array. Although FIG. 1 shows only one such processor 120, bare processing hardware 110 may include any number of processors, including any number of multicore processors, each with any number of execution cores, and any number of multithreaded processors, each with any number of threads.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120.

System memory 140 may be any medium on which information, such as data and/or program code, may be stored, such as static or dynamic random access memory, semiconductor-based read-only or flash memory, magnetic or optical disk memory, or any other type of medium readable by processor 120, or any combination of such mediums.

Devices 151, 152, 153, and 154 may each represent any number of any type of I/O, peripheral, or other devices, such as a keyboard, mouse, trackball, pointing device, monitor, printer, media card, network interface, information storage device, etc. Each of devices 151, 152, 153, and 154 may be embodied in a discrete component, or any one or more of them may be included in an integrated component with any other devices. In one embodiment, devices 151, 152, 153, and 154 may each represent a different function in a multifunctional I/O, peripheral, or other device.

Processor 120, chipset 130, system memory 140, and devices 151, 152, 153, and 154 may be coupled to or communicate with each other according to any known approach, such as directly or indirectly through one or more parallel, sequential, pipelined, asynchronous, synchronous, wired, wireless, or other bus or point-to-point connection. For example, chipset 130 includes interface 133 to receive transactions from devices 151, 152, 153, and 154. Bare platform hardware 110 may also include any number of additional devices, agents, components, or connections.

Bare platform hardware 110 is partitioned according to a partitioning technique into partitions 111 and 112. Core 121 of multicore processor 120, address translation logic 131 of chipset 130, portion 141 of system memory 140, and devices 151 and 153 are allocated to partition 111. Core 122 of multicore processor 120, address translation logic 132 of chipset 130, portion 142 of system memory 140, and devices 152 and 154 are allocated to partition 112. Each partition may also include additional processors, cores, chipset or other logic, portions of memory, devices, or any other physical resources described above or otherwise known in the art of information processing.

In addition to bare platform hardware 110, FIG. 1 illustrates virtualization environment 113, maintained by VMM 115, in partition 111 and virtualization environment 114, maintained by VMM 116, in partition 112. VMMs 115 and 116 may be any software, firmware, or hardware host installed on or accessible to bare platform hardware 110, to present VMs, i.e., abstractions of bare platform hardware 110, to guests, or to otherwise create VMs, manage VMs, and implement virtualization policies. VMMs 115 and 116 may each be an instance of the same VMM or an instance of two different VMMs.

A guest may be any OS, any VMM, including another instance of VMM 115 or 116, any hypervisor, or any application or other software. Each guest expects to access physical resources, such as processor and platform registers, memory, and input/output devices, of bare platform hardware 110, according to the architecture of the processor and the platform presented in the VM. FIG. 1 shows four VMs, with guest OS 171 and guest application 181 and device driver 185 installed on VM 161, guest OS 173 and guest application 183 and device driver 187 installed on VM 163, guest OS 172 and guest application 182 and device driver 186 installed on VM 162, and guest OS 174 and guest application 184 and device driver 188 installed on VM 164. Although FIG. 1 shows only four VMs and one application and one driver per VM, any number of VMs may be created, and any number of applications and/or drivers may run on each VM within the scope of the present invention.

A resource that can be accessed by a guest may either be classified as a "privileged" or a "non-privileged" resource. For a privileged resource, a VMM facilitates the functionality desired by the guest while retaining ultimate control over the resource. Non-privileged resources do not need to be controlled by a VMM and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by a VMM to ensure proper operation of VMs, protection of the VMM from guests, and protection of guests from each other.

At any given time, a processor core may be executing instructions from a VMM or any guest, thus, the VMM or the guest may be running on, or in control of, the processor core. When a privileged event occurs or a guest attempts to access a privileged resource, control may be transferred from the guest to the VMM. The transfer of control from a guest to a VMM is referred to as a "VM exit" herein. After handling the event or facilitating the access to the resource appropriately, the VMM may return control to a guest. The transfer of control from a VMM to a guest is referred to as a "VM entry" herein.

To support virtualization, address translation logic (e.g., address translation logic 131 or 132) may be used to map a device (e.g., device 151, 152, 153, or 154) to a domain (as described below) in system memory 140 in an I/O transaction. The I/O transaction is typically a direct memory access ("DMA") request (i.e., a request from an I/O device to directly access system memory 140), but may be any other type of transaction as well. Address translation logic provides hardware support to facilitate or enhance I/O device assignment and/or management. Address translation logic may be included in chipset 130, as shown in FIG. 1, or implemented, partly or wholly, in processor 120 or any other processor, co-processor, chipset, or other component.

A domain is abstractly defined as an isolated environment in the system, to which a subset of the system memory 140 is allocated. For example, each of VMs 161, 162, 163, and 164 may be considered to be a domain. Devices that are allowed to directly access the portion of system memory that is allocated to a domain are referred to as that domain's assigned devices. The isolation of a domain is achieved by blocking access to its allocated memory from devices that are not assigned to it. Multiple isolated domains are supported by ensuring that all devices are assigned to some domain (possibly a default domain), and restricting access from each assigned device to only the memory allocated to its domain.

Each domain has a view of system memory, or a physical address space, that may be different than the system view of memory. An address used to access system memory according to the system view of memory is referred to as a host physical address ("HPA"). An address used by a domain's resources to access its physical address space is referred to as a guest physical address ("GPA"). A domain is considered non-relocated if its GPA space is the same as, or a subset of, the HPA space. A domain is considered relocated if its GPA space is translated to access its allocated HPA space. The logical separation of GPA and HPA spaces provides the basis for enforcing memory protection. It requires an address protection and possibly translation mechanism that can validate GPAs generated by a domain's assigned devices and possibly translate them to valid HPAs. Address translation logic, such as address translation logic 131 and 132, provides hardware support for this functionality, sometimes referred to as DMA remapping.

Figure 2:
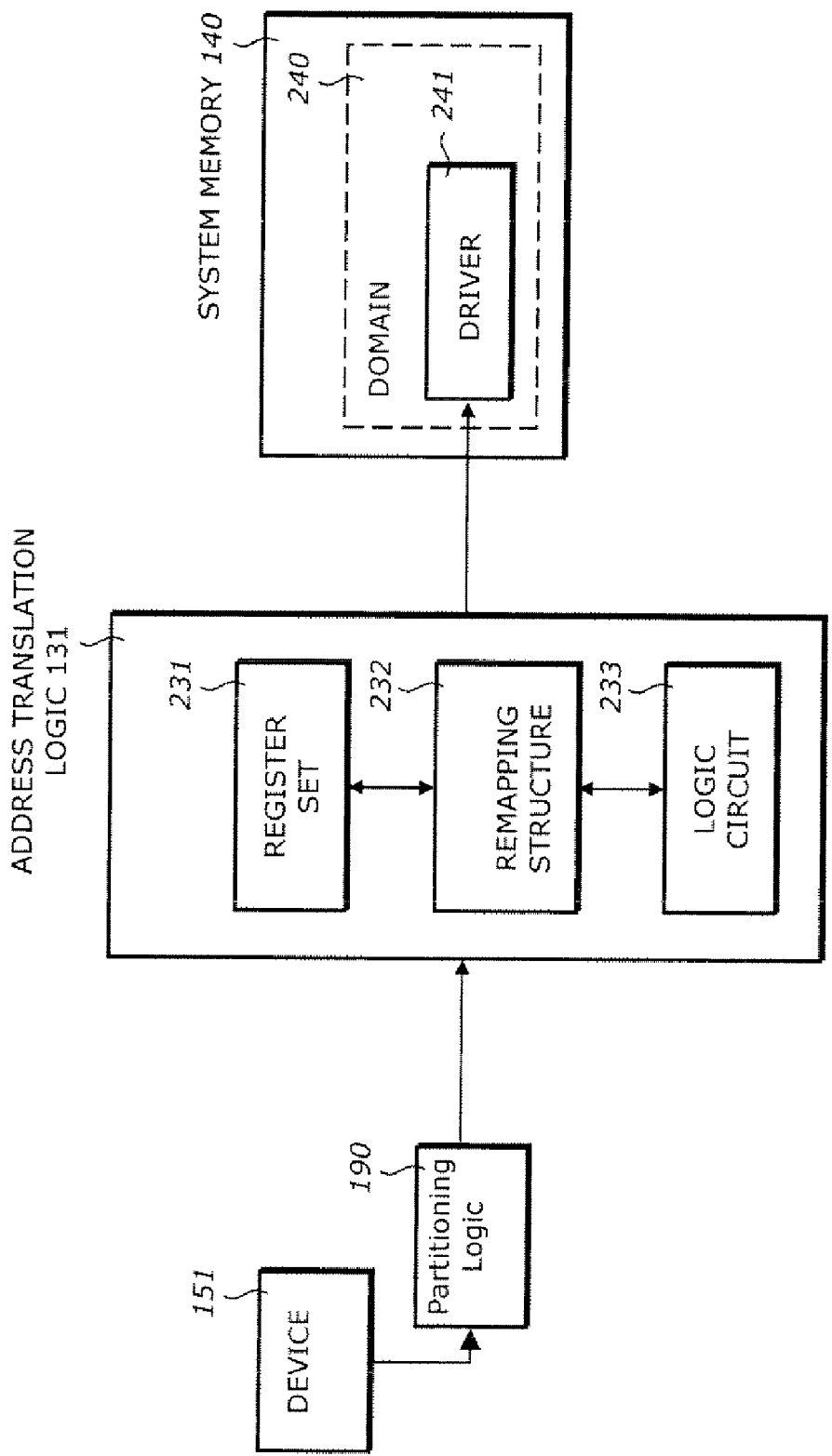
FIG. 2 illustrates an assignment of a device to a domain.

FIG. 2 is a diagram illustrating an example of a device assignment, or mapping, to a domain. In FIG. 2, device 151 is mapped into domain 240 in system memory 140. Domain 240 may include device driver 241, which may be any software that controls or otherwise supports device 151. The mapping of device 151 to domain 240 is supported by address translation logic 131.

Address translation logic 131 includes register set 231, remapping structure 232, and logic circuit 233. Register set 231 includes a number of registers that provide storage for control or status information used by remapping structure 232, logic circuit 233, and programs or drivers for devices. Remapping structure 232 provides the basic structure, storage, or tables used in the remapping or address translation of GPAs to HPAs. Logic circuit 233 includes circuitry to perform the remapping or address translation operations.

Returning to FIG. 1, each of devices 151, 152, 153, and 154 is shown as being assigned to a different domain. Address translation logic 131, in partition 111, supports the mapping of device 151 to the domain of VM 161 and the mapping of device 153 to the domain of VM 163. Device driver 185, in the domain of VM 161, controls device 151. Device driver 187, in the domain of VM 163, controls device 153. Address translation logic 132, in partition 112, supports the mapping of device 152 to the domain of VM 162 and the mapping of device 154 to the domain of VM 164. Device driver 186, in the domain of VM 162, controls device 152. Device driver 188, in the domain of VM 164, controls device 154.

Generally, guests access system resources through a VMM, for example, by causing a VM exit when attempting an I/O operation. However, because device 151 is assigned to VM 161 and its driver 185 runs on VM 161, guest OS 171 and application 181 may access device 151 without causing a VM exit to VMM 420. Furthermore, device 151 may access memory allocated to the domain of VM 161, e.g., through a DMA request, without causing a VM exit. Address translation logic 131 supports this capability by translating GPAs used by device 151 to corresponding HPAs, and denying access from device 151 to a memory location outside its allocated domain. Similarly, guest OS 172 and application 182 may access device 152, device 152 may access memory allocated to the domain of VM 162, guest OS 173 and application 183 may access device 153, device 153 may access memory allocated to the domain of VM 163, guest OS 174 and application 184 may access device 154, and device 154 may access memory allocated to the domain of VM 164, all without causing a VM exit.

Figure 3:
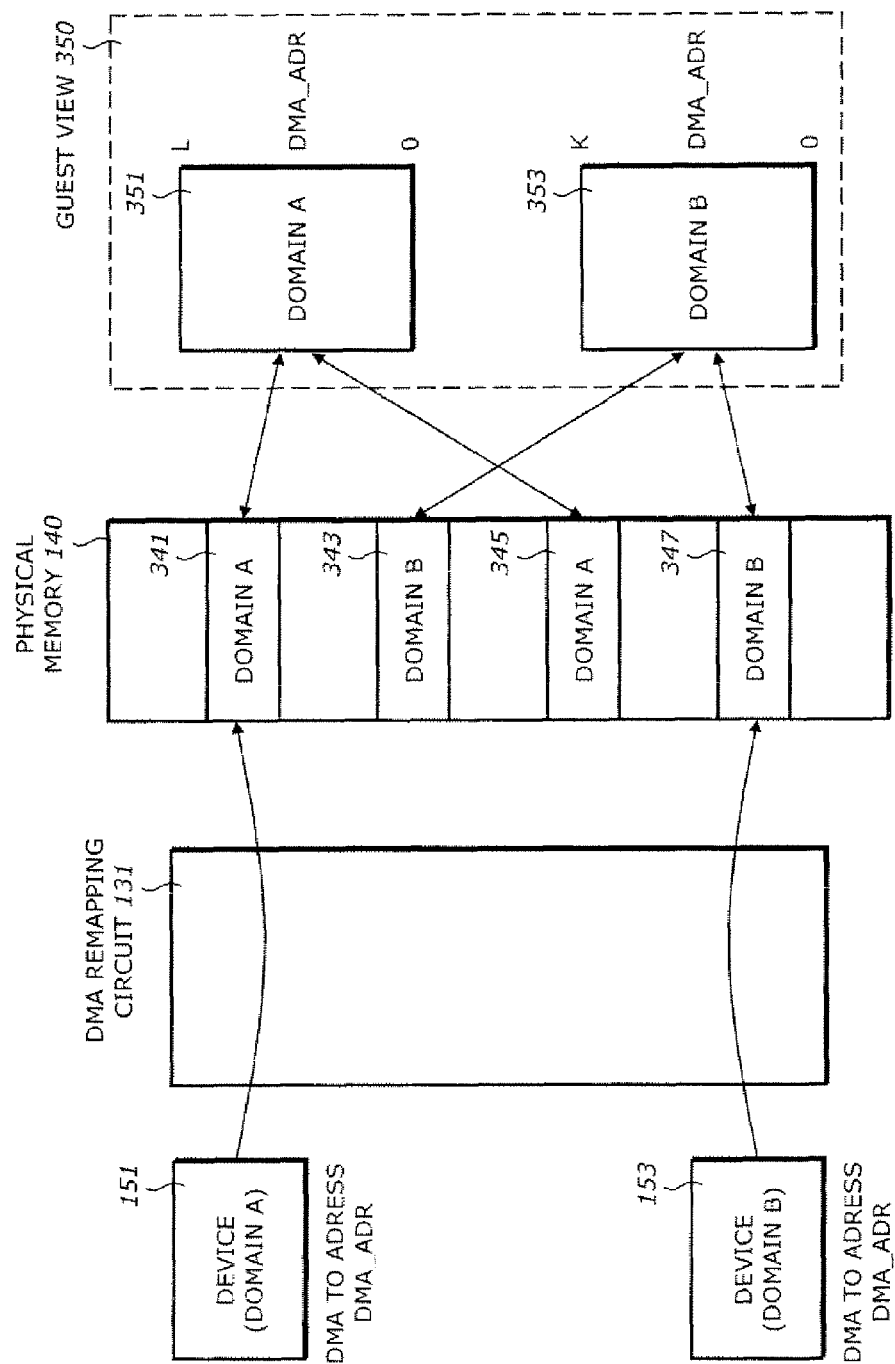
FIG. 3 illustrates address translation for a device to access system memory.

FIG. 3 illustrates an example of address translation for DMA remapping. In FIG. 3, device 151 is assigned to domain A and device 153 is assigned to domain B. Each device may perform an I/O request or DMA request to address DMA_ADR. Address translation logic 131 maps a request to DMA_ADR from device 151 to section 341 of physical memory 140, where sections 341 and 345 of physical memory are allocated to domain A. Likewise, address translation logic 131 maps a request to DMA_ADR from device 153 to section 347 of physical memory 140 where sections 343 and 347 of physical memory are allocated to domain B. Sections 341, 343, 345, and 347 may be the size of a page according to the memory management model of the system, or any other size of a portion of physical memory.

Guest view 350 of system memory is a logical view from the perspective of devices 151 and 153. Device 151 sees section 351 as the address space of the system, while device 153 sees section 353 as the address space of the system. VMM 115 or other software responsible for the creation and management of the domains allocates physical memory 140 for each domain and sets up the GPA to HPA translation function in address translation logic 131.

The address translation function implemented by address translation logic 131 depends on the physical memory management model of the system. For example, where host physical memory is allocated as contiguous regions to domains, the translation function may be a simple offset addition. Alternatively, address translation logic 131 may refer to a data structure to perform an address translation, for example where host physical memory is managed at page granularity. Other embodiments may use a data structure to define address ranges that individual devices are allowed to access. Other embodiments may use any combination of these or other techniques.

The data structure referred to by address translation logic 131 (the "memory access data structure"), may be any form of data structure, such as a single or multi-level table. The memory access data structure, or any portion of the memory access data structure, may be stored in any storage space accessible to address translation logic 131, such as remapping structure 232, or memory access table 141 in system memory 140. All or part of the information in the memory access data structure may be copied or duplicated in one or more storage spaces, for example, entries from memory access table 141, or results of translations by address translation logic 131, may be stored in a translation look-aside or other buffer in remapping structure 232 or elsewhere.

Figure 4:
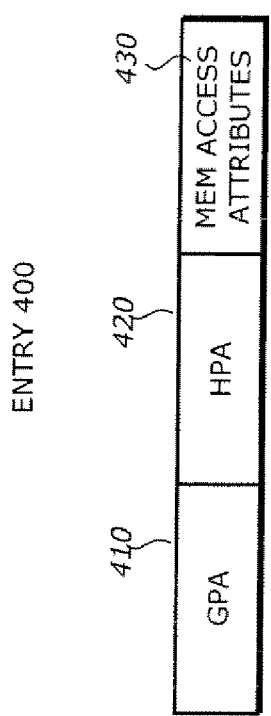
FIG. 4 illustrates an entry in a memory access data structure.

FIG. 4 illustrates entry 400 in a memory access data structure according to an embodiment of the invention. Entry 400 includes three fields, each of which may include any number of bit locations. GPA field 410 is to store a GPA, or a portion of a GPA, that may be used by a device to access system memory. HPA field 420 is to store an HPA, or a portion of an HPA, that corresponds to the GPA stored in GPA field 410, according to any memory address translation function, as described above. In one embodiment, each of the addresses stored in GPA field 410 and HPA field 420 specifies the base address of a page of system memory, such that all accesses to a single page in system memory require only one entry in the memory access data structure. In such an embodiment or in other embodiments, a single entry in a memory access data structure may represent a range of addresses rather than a single address.

Memory access attribute field 430 is to store memory access attributes corresponding to the entries in fields 410 and 420. For example, memory access field 430 may be used to store a value to indicate whether a DMA (or other I/O) transaction to the corresponding address or address range is permitted, a value to indicate whether processor caches must be snooped on a DMA (or other I/O) transaction to the corresponding address or address range, and any other values or indicators related to DMA (or other I/O) transactions to the corresponding address or address range.

Returning to FIG. 1, system 100 is partitioned into partitions 111 and 112. The partitioning may be implemented according to any known approach, such as by executing partitioning firmware or software at the time of system initialization to configure the system by assigning hardware resources, including devices, to each partition.

The assignment of a device to a partition may be accomplished and/or maintained according to any number of approaches. In a first approach, a device may be assigned to a portion of memory that corresponds to a particular partition. For example, a portion of memory may be allocated to a particular partition by storing one or more lower addresses, upper addresses, and/or offsets in one or more memory range or other registers, other storage locations, or data structure entries corresponding to that partition. Then, an access control list, map, or other data structure may be used to restrict a device to issuing and/or responding to transactions within that portion of memory. A device may be identified in an access control list, map, or other data structure with any unique identifier, such as a bus, device, function number ("BDF") that identifies the device according to its particular function within a particular device on a particular bus in the system.

According to a second approach, a device may be assigned directly to a partition. For example, a data structure may be created and/or maintained by partitioning firmware or software to store an identifier of each device in the system (e.g., a BDF) and an identifier of the partition to which it has been assigned. Alternatively, certain devices may be programmed to store an identifier of the partition to which they have been assigned. Other approaches are possible within the scope of the present invention.

According to any such device assignment approach, partitioning logic 190 determines to which partition a device involved in a transaction has been assigned. In one embodiment, partitioning logic 190 determines the partition to which a device has been assigned by looking up a device identifier associated with a transaction, such as the BDF included in a transaction, in an access control list or other such data structure. The access control list indicates the portion of memory to which the device is assigned, which in turn indicates the partition to which the device is assigned. In another embodiment, the device identifier associated with a transaction may be used to find an entry in a table, map, or other data structure that directly indicates to which partition the device has been assigned. In another embodiment, the transaction protocol may include a means for directly identifying a partition, for example by providing for a requesting device to include a partition identifier within the transaction.

Figure 5:
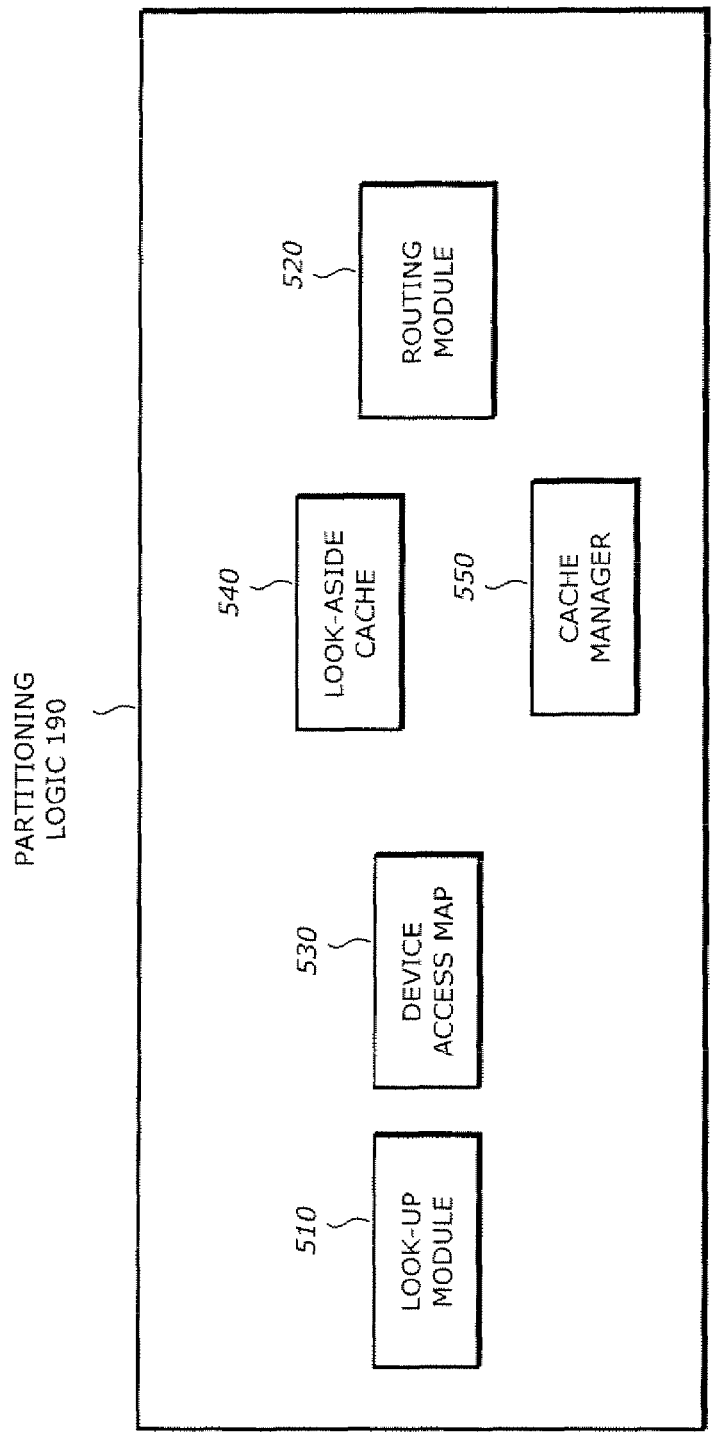
FIG. 5 illustrates the partitioning logic of the embodiment of FIG. 1.

FIG. 5 illustrates partitioning logic 190 according to the embodiment of FIG. 1. Look-up module 510 receives a transaction involving a device and determines to which partition the device has been assigned, as described above or according to any other approach. Routing module 520 routes the transaction to the address translation logic for the partition to which the device has been assigned. For example, for a DMA request from device 151, look-up module 510 determines that device 151 is assigned to partition 111, so routing module 520 routes the DMA request to address translation logic 131.

Look-up module 510 may refer to any individual or combination of access control lists, device access maps, memory range registers, or other storage locations or data structures to determine to which partition a device is assigned, as described above or according to any other approach. In the embodiment of FIG. 5, partitioning logic 190 includes device access map 530, which represents a storage location for information used by look-up module 510 to determine the device to partition assignments. Such information may be information used directly to determine the device to partition assignments, such as a tables or lists of device to memory, memory to partition, or any other system resource mappings, or may be pointers or references to any location or locations within system 100 where such information may be stored. Device access map 530 and/or any registers, memory addresses, or other storage locations or data structures to which it refers may be initialized and/or maintained by the partitioning firmware or software referred to above, or by any OS, VMM, or other such software.

In the embodiment of FIG. 5, partitioning logic 190 also includes look-aside cache 540 to store results from any previous determinations by look-up module 510. For example, where look-up module 510 uses a BDF to determine a partition to which a device is assigned, the BDF and an identifier of the address translation logic allocated to that partition may be stored in a look-aside cache entry. Thereafter, that BDF to address translation logic mapping may be found in look-aside cache 540 instead of determined by look-up module 510.

Partitioning logic 190 also includes look-aside cache manager 550 to invalidate look-aside cache entries corresponding to devices that have been removed from system 100. For example, if a removable device board or card is removed from a peripheral bus slot, cache manager 550 invalidates all entries in look-aside cache 540 that correspond to that device board or card. Then, a new device board or card may be inserted in that slot and assigned to a different partition.

Figure 6:
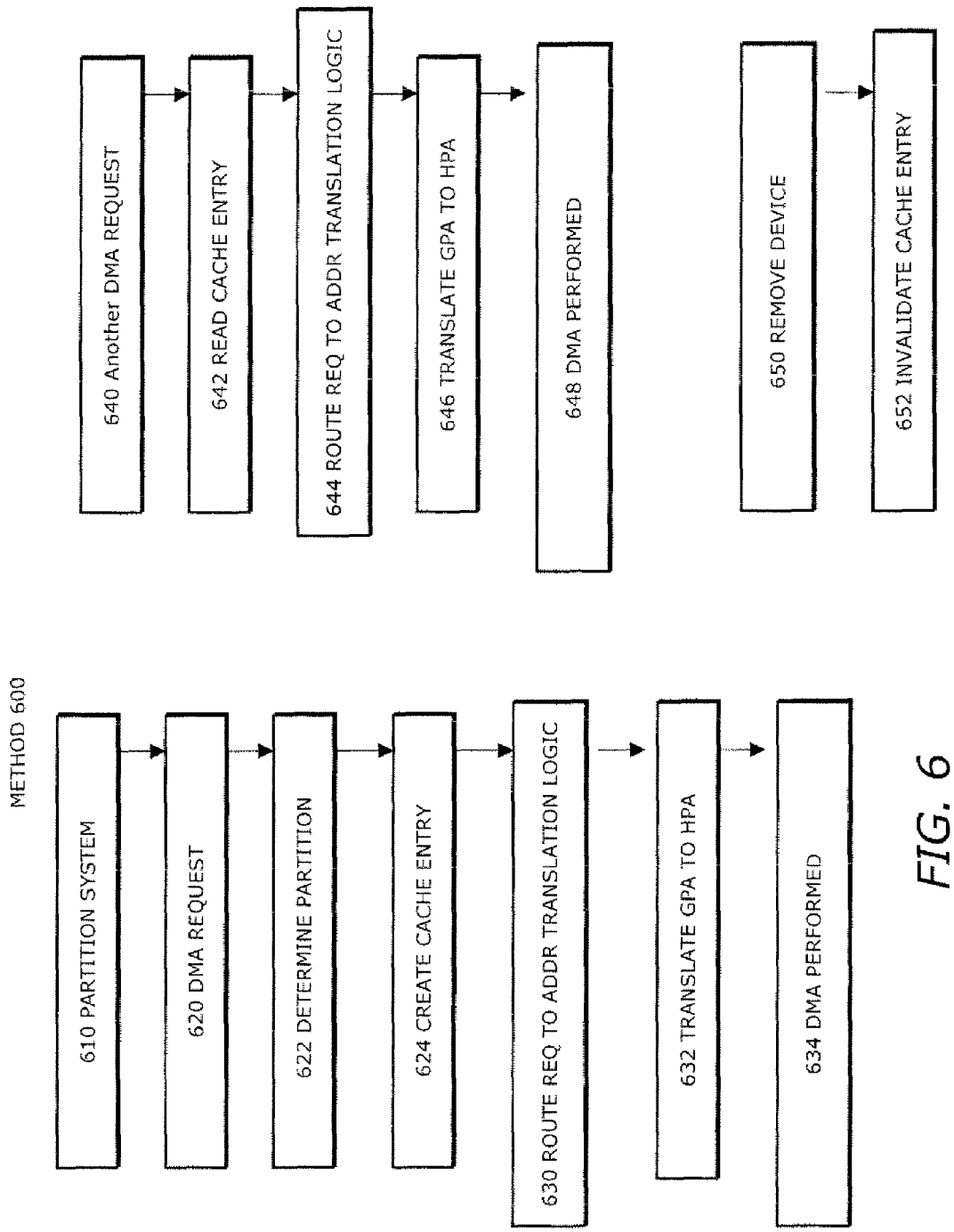
FIG. 6 illustrates a method embodiment of the present invention.

FIG. 6 illustrates an embodiment of the present invention in method 600, a method for guest to host address translations for devices to access memory in a partitioned system. Although method embodiments are not limited in this respect, reference is made to the description of system 100 of FIG. 1 to describe the method embodiment of FIG. 6.

In box 610 of FIG. 6, a system, e.g., system 100, is partitioned into two partitions, e.g., partitions 111 and 112. The partitioning includes allocating system resources, such as portions of system memory, I/O devices, and address translation logic to each partition. For example, device 151 may be allocated to partition 111 and device 152 may be allocated to partition 112. Device 151 and 152 may have a guest view of system memory that includes the same guest physical address (e.g., DMA_ADR).

In box 620, device 151 initiates a transaction that involves accessing system memory, such as a DMA request. The transaction includes a device identifier, e.g., the BDF of device 151, and a guest physical address, e.g., DMA_ADR.

In box 622, the device identifier is used to determine to which partition the device is assigned, e.g., partition 111. In box 624, a look-aside cache entry is created. The cache entry includes the device identifier, and an identifier of the address translation logic that has been allocated to partition 111, e.g., address translation logic 131.

In box 630, the transaction is routed to address translation logic 131, thereby disambiguating the guest physical address DMA_ADR used by device 151 from the guest physical address DMA_ADR used by device 152. In box 632, address translation logic 131 translates the guest physical address DMA_ADR to a host physical address in partition 111. In box 634, the transaction initiated in box 620 is completed to the host physical address found in box 632.

In box 640, device 151 initiates another transaction that involves accessing system memory, such as a DMA request. The transaction includes a device identifier, e.g., the BDF of device 151, and a guest physical address, e.g., DMA_ADR.

In box 642, the device identifier is found in the look-aside cache. In box 644, the transaction is routed to address translation logic 131 based on the entry found in the look-aside cache. In box 646, address translation logic 131 translates the guest physical address DMA_ADR to a host physical address in partition 111. In box 648, the transaction initiated in box 640 is completed to the host physical address found in box 646.

In box 650, device 151 is removed from system 100. In box 652, the look-aside cache entry corresponding to device 151 is invalidated.

Within the scope of the present invention, method 600 may be performed with illustrated boxes omitted, with additional boxes added, or with a combination of reordered, omitted, or additional boxes. For example, where the transaction includes a partition identifier, boxes 622 and 624 may be omitted.

Any component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. A memory, or a magnetic or optical storage medium, such as a disc, may be the machine-readable medium. Any of these media may "carry" or "indicate" the design, or other information used in an embodiment of the present invention.

Thus, apparatuses, methods, and systems for guest to host address translations for devices to access memory in a partitioned system have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   an interface to receive a request from a device to access memory in a partitioned system;
   partitioning logic to determine whether the device is assigned to a first partition or a second partition in the partitioned system;
   first address translation logic to translate a first guest address to a first host address in the first partition; and
   second address translation logic to translate a second guest address to a second host address in the second partition.

2. The apparatus of claim 1, wherein the partitioning logic is also to forward the request to the first address translation logic in response to determining that the device is assigned to the first partition and to forward the request to the second address translation logic in response to determining that the device is assigned to the second partition.

3. The apparatus of claim 1, wherein the partitioning logic includes a look-up module to use a device identifier included in the request to determine a partition identifier.

4. The apparatus of claim 3, wherein the look-up module is to use the device identifier to find an entry in a data structure.

5. The apparatus of claim 3, wherein the entry indicates a memory range to which the device has access.

6. The apparatus of claim 3, wherein the entry indicates a partition identifier.

7. The apparatus of claim 1, wherein the partitioning logic includes a cache to store the result of the determination.

8. The apparatus of claim 2, wherein the partitioning logic is to determine whether the device is assigned to a first partition or a second partition based on a partition identifier included in the request.

9. The apparatus of claim 2, wherein the partitioning logic also includes translation support logic to support the first address translation logic and the second address translation logic.

10. A method comprising:
    receiving a request from a device to access memory in a partitioned system;
    determining whether the device is assigned to a first partition or a second partition in the partitioned system;
    forwarding the request to first address translation logic in response to determining that the device is assigned to the first partition; and
    forwarding the request to second address translation logic in response to determining that the device is assigned to the second partition.

11. The method of claim 10, further comprising using a device identifier included in the request to determine a partition identifier.

12. The method of claim 11, further comprising using the device identifier to find an entry in a data structure.

13. The method of claim 12, wherein the entry indicates a memory range to which the device has access.

14. The method of claim 12, wherein the entry indicates a partition identifier.

15. The method of claim 10, further comprising storing the result of the determination in a cache.

16. The method of claim 10, wherein determining includes reading a cache entry storing the result of a previous determination of whether the device is assigned to the first partition or the second partition.

17. The method of claim 16, further comprising invalidating the cache entry in response to the device being removed from the system.

18. A system comprising:
    a first partition including:
       a first portion of a memory;
       a first device; and
       first address translation logic to translate a first guest address to a first host address in the first portion of the memory;
    a second partition including:
       a second portion of the memory;
       a second device; and
       second address translation logic to translate a second guest address to a second host address in the second portion of the memory; and
    partitioning logic to forward a first request from the first device to the first address translation logic and to forward a second request from the second device to the second address translation logic.

19. The system of claim 18, wherein the partitioning logic is to forward the first request in response to using a first device identifier to find an entry in a data structure, wherein the entry indicates that the first device is assigned to the first partition.

20. The system of claim 18, wherein the memory is dynamic random access memory.

* * * * *